United States Patent
Meter

(10) Patent No.: US 12,465,026 B2
(45) Date of Patent: Nov. 11, 2025

(54) METHOD FOR INCUBATING A POULTRY EGG ON A HATCHERY

(71) Applicant: HATCHTECH GROUP B.V., De Klomp (NL)

(72) Inventor: Tjitze Meter, Rhenen (NL)

(73) Assignee: HATCHTECH GROUP B.V., De Klomp (NL)

( * ) Notice: Subject to any disclaimer, the term of this patent is extended or adjusted under 35 U.S.C. 154(b) by 0 days.

(21) Appl. No.: 18/854,989

(22) PCT Filed: Apr. 19, 2023

(86) PCT No.: PCT/NL2023/050204
§ 371 (c)(1),
(2) Date: Oct. 8, 2024

(87) PCT Pub. No.: WO2023/204703
PCT Pub. Date: Oct. 26, 2023

(65) Prior Publication Data
US 2025/0248371 A1 Aug. 7, 2025

(30) Foreign Application Priority Data
Apr. 22, 2022 (NL) .................................... 2031679

(51) Int. Cl.
*A01K 41/02* (2006.01)
(52) U.S. Cl.
CPC .................................. *A01K 41/02* (2013.01)
(58) Field of Classification Search
CPC ....... A01K 41/04; A01K 41/023; A01K 41/02
See application file for complete search history.

(56) References Cited

U.S. PATENT DOCUMENTS

| 1,758,017 A | * | 5/1930 | Watson ................ A01K 41/023 |
| | | | 237/4 |
| 3,038,443 A | | 6/1962 | Miller |

(Continued)

FOREIGN PATENT DOCUMENTS

| CA | 2944310 C | * | 3/2022 | ........... A01K 41/023 |
| EP | 2105048 A1 | | 9/2009 | |

(Continued)

OTHER PUBLICATIONS

Kollmann Filho, J., Zampar, A., Boiago, M.M. and Da Silva, A.S., 2020. Effect of heat treatment on pre-stocking of Turkey eggs and its impact on incubation and hatching. Journal of thermal biology, 88, p. 102501.

*Primary Examiner* — Monica L Perry
(74) *Attorney, Agent, or Firm* — Ipsilon USA—NLO

(57) ABSTRACT

The current invention relates to Method for incubating a poultry egg on a hatchery, the hatchery comprising:
an egg storage section configured for storing eggs,
an incubating device separate from the egg storage section and configured for incubating eggs during an incubation period at an incubation temperature,
the method comprising the steps of;
receiving in the storage section a number of eggs at a time of arrival,
storing a number of eggs in the egg storage section for a heating period in storage of at least 1 days, and
transporting the number of eggs from the storage section into the incubating device,
incubating the number of eggs in the incubating device during the incubation period until hatching occurs,
characterized in that the method comprises;
determining a temperature course over time to which the number of eggs should be exposed based on the time of arrival and desired moment of hatching, wherein the (Continued)

Figure 1:
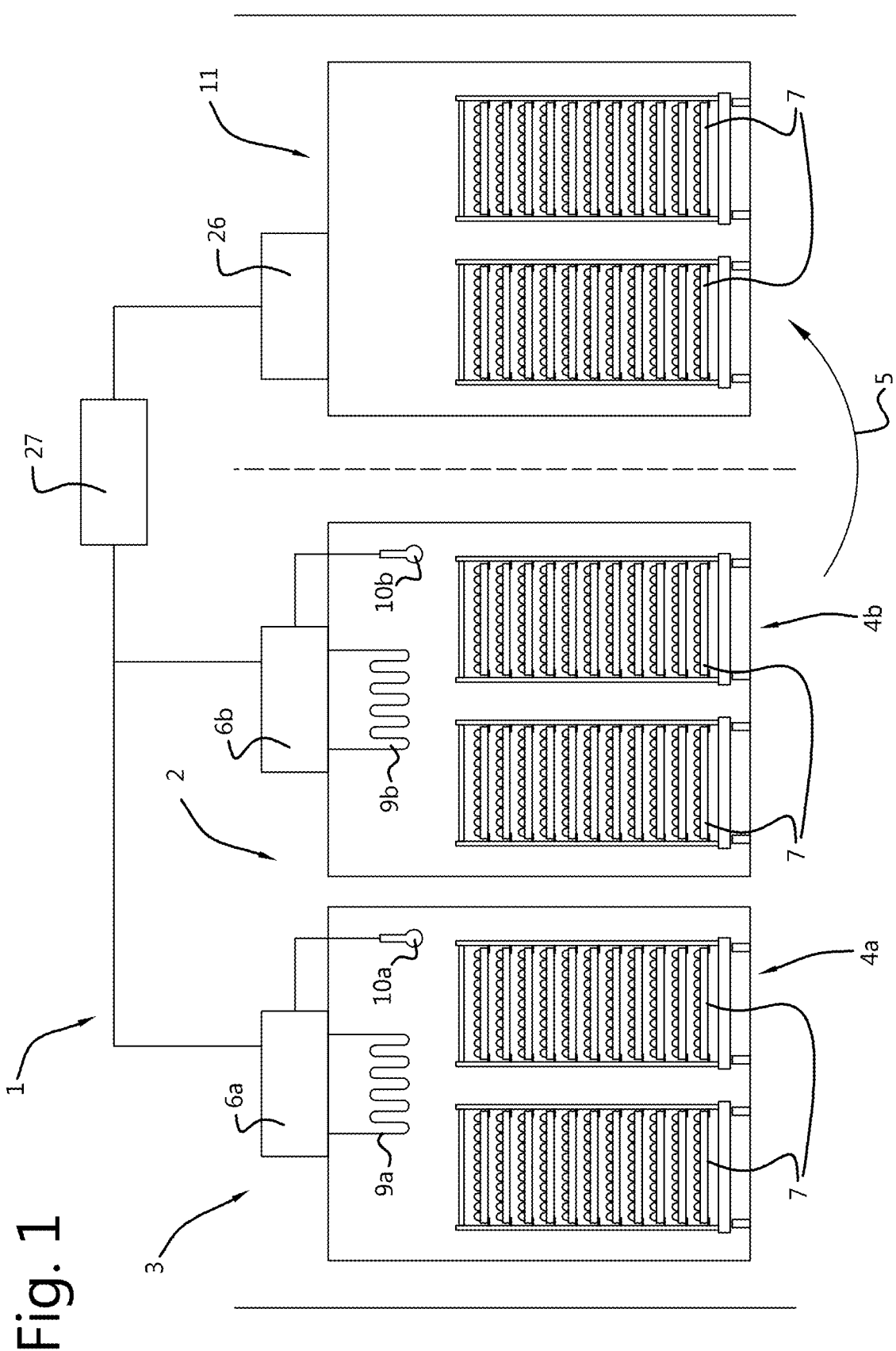

temperature course over time at least comprises a temperature increase during the heating period in storage in the storage section from an initial temperature to a set temperature between a physiological zero and the incubation temperature, heating the number of eggs during the heating period in storage from the initial temperature to the set temperature.

18 Claims, 6 Drawing Sheets

(56) References Cited

U.S. PATENT DOCUMENTS

| | | | | | |
|---|---|---|---|---|---|
| 3,712,268 | A | * | 1/1973 | Reed | G05D 23/1934 |
| | | | | | 219/385 |
| 3,854,452 | A | * | 12/1974 | Bardet | A01K 41/04 |
| | | | | | 119/319 |
| 11,071,285 | B2 | * | 7/2021 | Grajcar | A01K 41/023 |
| 2018/0216833 | A1 | * | 8/2018 | Baker | F24C 15/04 |

FOREIGN PATENT DOCUMENTS

| | | | |
|---|---|---|---|
| FR | 1169450 | A | 12/1958 |
| NL | 2011847 | C2 | 6/2015 |
| WO | 2021251490 | A1 | 12/2021 |

* cited by examiner

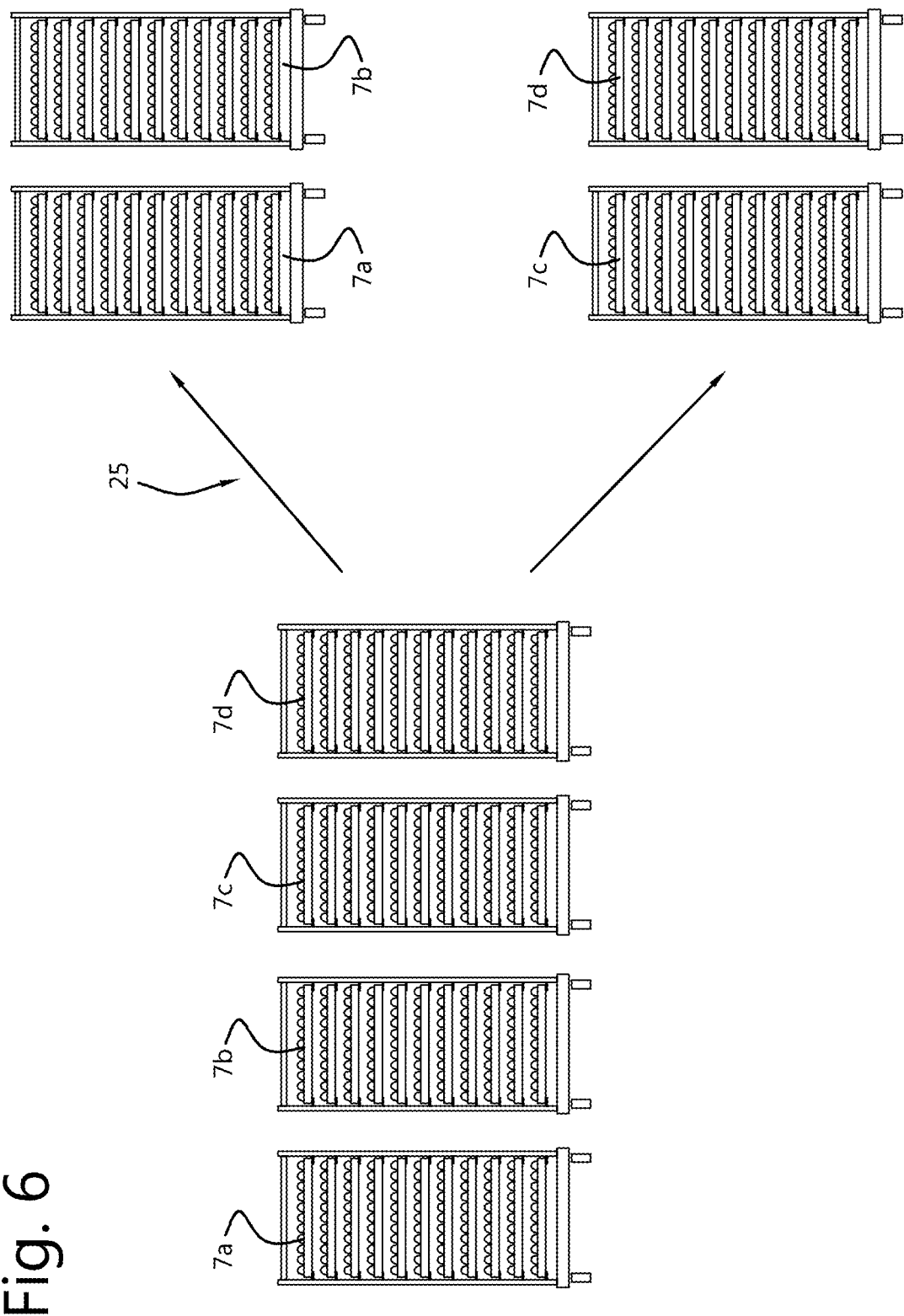

METHOD FOR INCUBATING A POULTRY EGG ON A HATCHERY

FIELD OF THE INVENTION

The present invention relates to a method for incubating a poultry egg on a hatchery, the hatchery comprising:
- an egg storage section configured for storing eggs,
- an incubating device separate from the egg storage section and configured for incubating eggs during an incubation period at an incubation temperature, the method comprising the steps of;
- receiving in the storage section a number of eggs at a time of arrival, and
- storing a number of eggs in the egg storage section.

The present invention relates in particular to a method for incubating a number of chicken eggs on an industrial hatchery wherein the number of eggs comprises large volumes of chicken eggs like easily more than 100 k chicken eggs.

BACKGROUND ART

It is common practice in incubating industry to do the transition from storage temperature of usually below 64° F. (17.8° C.) to incubation temperature of about 100° F. (37.8° C.) as soon as possible.

For long stored eggs, that is longer than 14 days in storage, the as soon as possible heating approach has a negative effect on chick quality and hatchability. To compensate for long storage, it is known to apply so called "Spides" meaning Short Periods of Incubation During Egg Storage. The eggs are quickly heated to about 90° F. (32.2° C.) and then cooled back to storage temperature.

EP2105048A1 relates to incubation and aims to provide a means for providing poultry with higher vitality, a better growth and better nutrient uptake efficiency, which can easily be implemented on poultry farms. EP2105048A1 therefore teaches to, for the last third of the incubation period, raise the temperature from the basal temperature to an adaptation temperature of 38.0 DEG C.-39.8 DEG C. for a total of between 30 minutes and 6 hours per day.

In a so-called single stage incubator, all embryos have the same age which enables to make use of "warming profiles" as described in NL2011847C2. In contrast, in a multistage incubator the embryos differ in age and a warming profile is not used. In general, there are two ways or methods to start the incubation process in a single stage incubator. In both ways the warming profile contains two warming phases. The first phase is warming from the storage temperature (20° C. or below) to a temperature around 25° C. The second phase is warming from a temperature around 25° C. to a temperature around 37.8° C. In both existing methods the first phase intends to prevent condensation on the eggs, which condensation is undesirable since it may promote growth of germs.

The first method to prevent condensation is to warm the eggs to 25° C. in a corridor during a short period of about 5 hours. When the egg reached the temperature around 25° C., eggs are placed in the setter and the setter is warmed to an air temperature around 37.8° C. as fast as possible. In the corridor in front of the setter, eggs are not warmed uniformly because the airflow through the eggs is not controlled.

The second method to prevent condensation is to set eggs from the storage room immediately in the setter. In the setter eggs are warmed to a temperature around 25° C. according to a warming profile. After reaching an air temperature of 25° C., the incubator warms the eggs in the second phase to a temperature around 37.8° C. as fast as possible.

In the prior art, almost all of the time of the eggs in storage is lost time from perspective of development of the embryo as well as from perspective of value of footprint of the hatchery. No value is added and storing provides only a buffer that is needed for complete filling of the incubation batches. Storage of hatching eggs longer than 7 days causes a delay in hatch time and a decline in hatchability and chick quality. Hatchability declines with approximately 1% per day after 7 days of storage. During storage changes occur in the embryo. One of the changes is that cells in the embryo die. This can have a negative effect on embryo viability and consequently increases embryonic death.

There is room for improvement for known incubating processes on a hatchery.

SUMMARY OF THE INVENTION

The invention aims to provide an improved efficiency for a method for incubating a poultry egg on a hatchery. This improved efficiency may involve a better hatchability and a better average chick quality. Hatchability here means, the percentage of chicks that hatch from a batch of eggs. This improved efficiency may also involve a better use of resources at a hatchery.

Another object of the invention is to improve a known method for incubating a poultry egg on a hatchery in that a problem associated therewith is at least partly solved.

Yet another object of the invention is to provide an alternative method for incubating a poultry egg on a hatchery.

According to the present invention, a method as defined above, for incubating a poultry egg on a hatchery is provided, in which the method comprises;
- storing a number of eggs in the egg storage section for a heating period in storage of at least 1 days, and
- transporting the number of eggs from the storage section into the incubating device,
- incubating the number of eggs in the incubating device during the incubation period until hatching occurs, wherein the method comprises;
- determining a temperature course over time to which the number of eggs should be exposed based on the time of arrival and desired moment of hatching, wherein the temperature course over time at least comprises a temperature increase during the heating period in storage in the storage section from an initial temperature to a set temperature between a physiological zero and the incubation temperature,
- controlled heating the number of eggs during the heating period in storage from the initial temperature to the set temperature according to the temperature course over time.

The method according to the invention enables a better use of available time for development of a poultry embryo in that already in the storage section the temperature is above the physiological zero and the embryo is activated while the temperature increase during the heating period in storage in the storage section from an initial temperature to a set temperature enables a gradual and gentle activation of the embryo.

From a different perspective, the method according to invention enables a better use of a hatchery footprint. The storage section is not only used as a buffer as is the case in the prior art. Instead, in the storage section, the poultry embryos are already activated. And because of the use of the determined temperature course over time, the moment of hatching of eggs is still predictable despite that the eggs are already activated in the storage section.

In this context, the initial temperature is usually a storage temperature of less than 64° F. (17.8° C.) like for example about 53° F. (11.7° C.). Depending on the circumstances, like season of the year, the temperature of the number of eggs upon arrival can be different. It may be required to cool or heat the number of eggs toward the initial temperature. In relation to the set temperature: The "physiological zero" is the temperature from which the embryo starts to develop and is about between 80-90° F. (26.7-32.2° C.). The incubation temperature is about 96-103° F. (35.6-39.4° C.) and when taken precisely 100-100.4° F. (37.8-38.0° C.) air temperature in a running incubation device.

In an embodiment of the method according to the invention, the egg storage section comprises a number of compartments, wherein at least two respective compartments of the number of compartments have their own respective temperature control system to enable operating the at least two respective compartments at a different temperature. This enables a more individual treatment of batches of eggs that are at a different level of development of the embryo. In other words, different single stage processes can run in parallel, and each compartment has its own temperature course over time to which the number of eggs should be exposed. This temperature course is made available to the temperature control system accordingly as a setting in order to determine the temperature course over time.

In an embodiment of the method according to the invention, the step of determining a temperature course over time is done individually for at least one compartment of the number of compartments. This enables all the more an individual treatment of batches of eggs that are at a different level of development of the embryo. In particular the step of determining a temperature course over time is done individually for each compartment of the number of compartments.

In an embodiment of the method according to the invention, the method comprises organizing and/or grouping of the number of eggs into batches of eggs and individually for each of the batches of eggs determining a temperature course over time. This enables to gather eggs that are at a similar or same development phase. This enables even more a better use of available time for development of a poultry embryo as well as a better use of a hatchery footprint.

In an embodiment of the method according to the invention, the heating period in storage in the storage section is at least 24 hours, more preferably at least 48 hours and even more preferably more than 96 hours. The longer the heating period in storage, the more beneficial the method according to the current invention can be.

In an embodiment of the method according to the invention, heating the number of eggs in the storage section from the initial temperature to the set temperature comprises increasing the temperature during at least 80% of the heating period in storage, in particular during the entire heating period in storage. The temperature increase during 80% or all of the heating period in storage in the storage section from an initial temperature to a set temperature enables even more a gradual and gentle activation of the embryo while temperature stress is reduced as much as possible. It may still be conceivable to superimpose a Spides, as described above, on the increasing temperature in the heating period in storage. Such a Spides has no net heating and may, despite of some temperature stress, still have a useful effect on very long stored eggs, that is longer than 21 days.

In an embodiment of the method according to the invention, the method comprises increasing the temperature during the heating period in storage with linear progression in an interval of at least 12 hours, in particular in an interval of at least 50% of the heating period in storage, more in particular during about the entire heating period in storage. This even more enables a gradual and gentle activation of the embryo while temperature stress is reduced as much as possible. In particular, the temperature gradient can be minimized during the entire heating period in storage.

In an embodiment of the method according to the invention, during the step of heating the number of eggs during the heating period in storage from the initial temperature to the set temperature, the gradient over a time interval of 24 hours is between 0,075 and about 1 degree per hour. This even more enables a gradual and gentle activation of the embryo while temperature stress is reduced as much as possible.

In an embodiment of the method according to the invention comprises taking advantage of about the entire heating period in storage to heat the number of eggs evenly over time. This even more enables a gradual and gentle activation of the embryo while temperature stress is reduced as much as possible.

In an embodiment of the method according to the invention, the method comprises adjusting the incubation period depending on the heating period in storage. This enables to reduce the incubation period like for example with at least 12 hours compared to industry standard. Industry-standard stay in the incubating device is 21 days.

In an embodiment of the method according to the invention, the temperature course over time comprises a predetermined accommodation period wherein the number of eggs is maintained at the initial temperature, that is usually the storage temperature of less than 64° F. (17.8° C.). Allowing the number of eggs to rest for a predetermined accommodation period directly after arrival at the hatchery has a positive effect on the embryo. "Predetermined" here means that there is no relation 15 with the time of arrival and desired moment of hatching. The predetermined accommodation period enables the pH within the egg to rise which seems to improve conditions for embryo development. After day 4, the pH stabilizes and there is no added benefit. Storing for less than 4 days has been seen to result in lower hatchability and higher early embryonic mortality. The pH within the egg rises to 9.0 in 4 days of storage time and there are indications that this increase in pH is optimal for embryo development. After day 4, the pH stabilizes and there is no added benefit.

In an embodiment of the method according to the invention, the temperature course over time comprises a predetermined activation period wherein the number of eggs is heated from the initial temperature to the physiological zero. Again, "predetermined" here means that there is no relation with the time of arrival and desired moment of hatching. The predetermined activation period is usually about 5 hours. In research it was found that extending the first 5 hours of heating from storage temperature to the physiological zero did not provide additional benefit or even seemed to have a negative effect. In other words, a predetermined activation period longer than 5 hours seems not useful.

In an embodiment of the method according to the invention, the heating period in storage is at least four times the predetermined activation period. This even more allows a gradual and gentle activation of the embryo while temperature stress is reduced as much as possible.

In an embodiment of the method according to the invention, the determining the temperature course over time to which the number of eggs should be exposed, commences as soon as possible, preferably directly, after the time of arrival. This even more allows to optimise the temperature gradient during the entire stay of the number of eggs in the storage section. In other words, this even more enables a gradual and gentle activation of the embryo while temperature stress is reduced as much as possible. It will be clear that "after the time of arrival" also includes the case "as soon as the time of arrival can be determined". It will be understood that as soon as the temperature course over time to which the number of eggs should be exposed is determined, the execution thereof starts as soon as possible to enjoy the benefits of the current invention.

In an embodiment of the method according to the invention, the number of eggs comprise long stored eggs. "Long stored eggs" is to say stored for over 14 days in total after lay. The storage can include storage outside the hatchery, e.g., storage on a laying farm. In particular for long stored eggs the current invention is beneficial to gradually and gently activate the embryo while temperature stress is reduced as much as possible. Any storage longer than 7 days shows negative effects on early embryonic mortality. The longer the storage, like longer than 14 days, the more pronounced becomes the negative effect and the more beneficial the current invention.

In an embodiment of the method according to the invention, the set temperature is the incubation temperature or about the incubation temperature. This allows to continuously run the incubation device at the incubation temperature.

In an embodiment of the method according to the invention, the temperature course over time comprises heating the number of eggs in the incubating device from the set temperature to the incubation temperature. This allows a smooth transition of the number of eggs from the egg storage section to the incubating device wherein temperature stress is reduced as much as possible.

According to the present invention, there is provided an egg storage system for use in a method as defined above. The egg storage system comprises an egg storing section configured for storing eggs during a heating period in storage prior to incubation, wherein the egg storage section is configured to heat eggs from an initial temperature to a set temperature, wherein the egg storage section comprises a temperature control system to control a temperature in the egg storage section according to the temperature course over time to which the number of eggs should be exposed. The temperature control system normally includes a temperature sensor for measuring a temperature within the egg storage section, as well as a control unit and a heating means. The temperature to be measured may include an air temperature and/or an eggshell temperature. In response to the measured temperature, the control unit will instruct the heating means accordingly in order to follow the temperature course over time to which the number of eggs should be exposed to. The heating means can be any suitable source of heat associated with the egg storage section. It is conceivable that there is provided a common source of heat that is then distributed in a controlled manner to individual egg storage sections.

In an embodiment of the egg storage according to the invention, the egg storage section comprises a number of compartments, wherein at least two respective compartments of the number of compartments have their own respective temperature control system to enable operating the at least two respective compartments at a different temperature. Having an "own respective temperature control system" means that the temperature can be individually controlled in any of the two respective compartments.

In an embodiment of the egg storage according to the invention, the egg storage section comprises a number of respective compartments, and wherein each of the number of respective compartments comprise a respective temperature control system to control a temperature in the respective compartment according to a respective temperature course over time to which the number of eggs should be exposed.

In an embodiment of the egg storage according to the invention, the egg storage section comprises a partition member for temporary separating adjacent compartments of the number of compartments. This allows a flexible partitioning of the egg storage section.

In an embodiment of the egg storage according to the invention, the partition member comprises a temporary cover enclosing an egg trolley, and the temperature control system controls a temperature within the egg trolley. It will be clear that the temporary cover can enclose any suitable number of trolleys.

According to the present invention, there is provided a hatchery comprising:
  the egg storage system as defined above, and
  an incubating device separate from the egg storage section
    and configured for incubating eggs during an incubation period at an incubation temperature until hatching
    is about to occur.

The hatching itself is normally done in a hatching device at the hatchery. During a hatching window of about 2 days, all of the number of eggs hatch in the hatching device.

In an embodiment of the hatchery according to the invention, the hatchery comprises a central control unit operationally coupled with both the temperature control system of the egg storage section and a temperature control system of the incubating device, wherein the central control unit comprises instructions in accordance with the temperature course over time to which the number of eggs should be exposed to. The central control unit all the more allows a smooth transition of the number of eggs from the egg storage section to the incubating device wherein temperature stress is reduced as much as possible.

SHORT DESCRIPTION OF DRAWINGS

Figure 2:
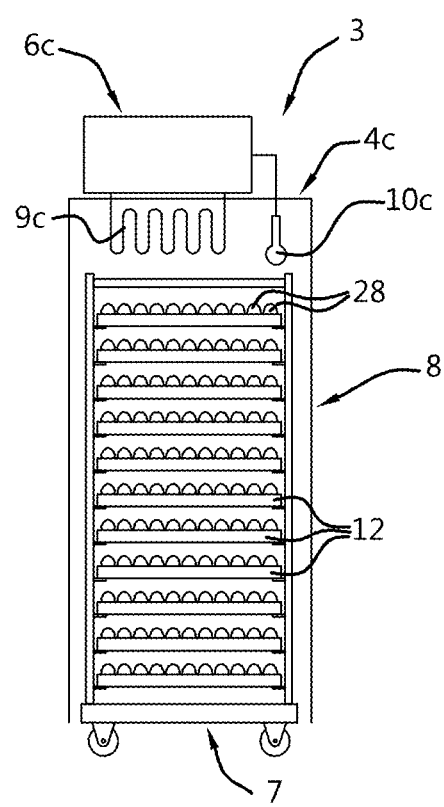
Figure 3:
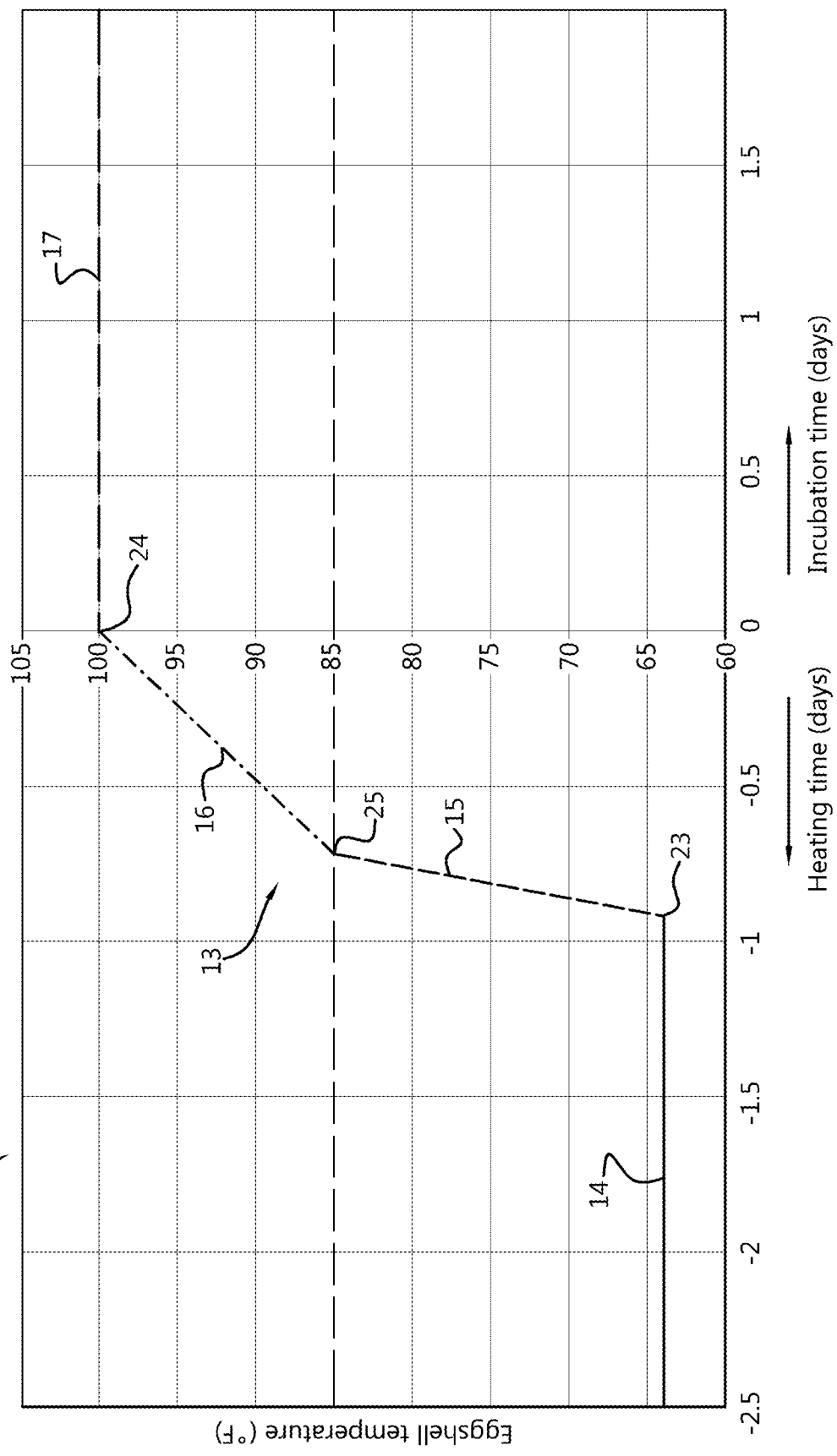
Figure 4:
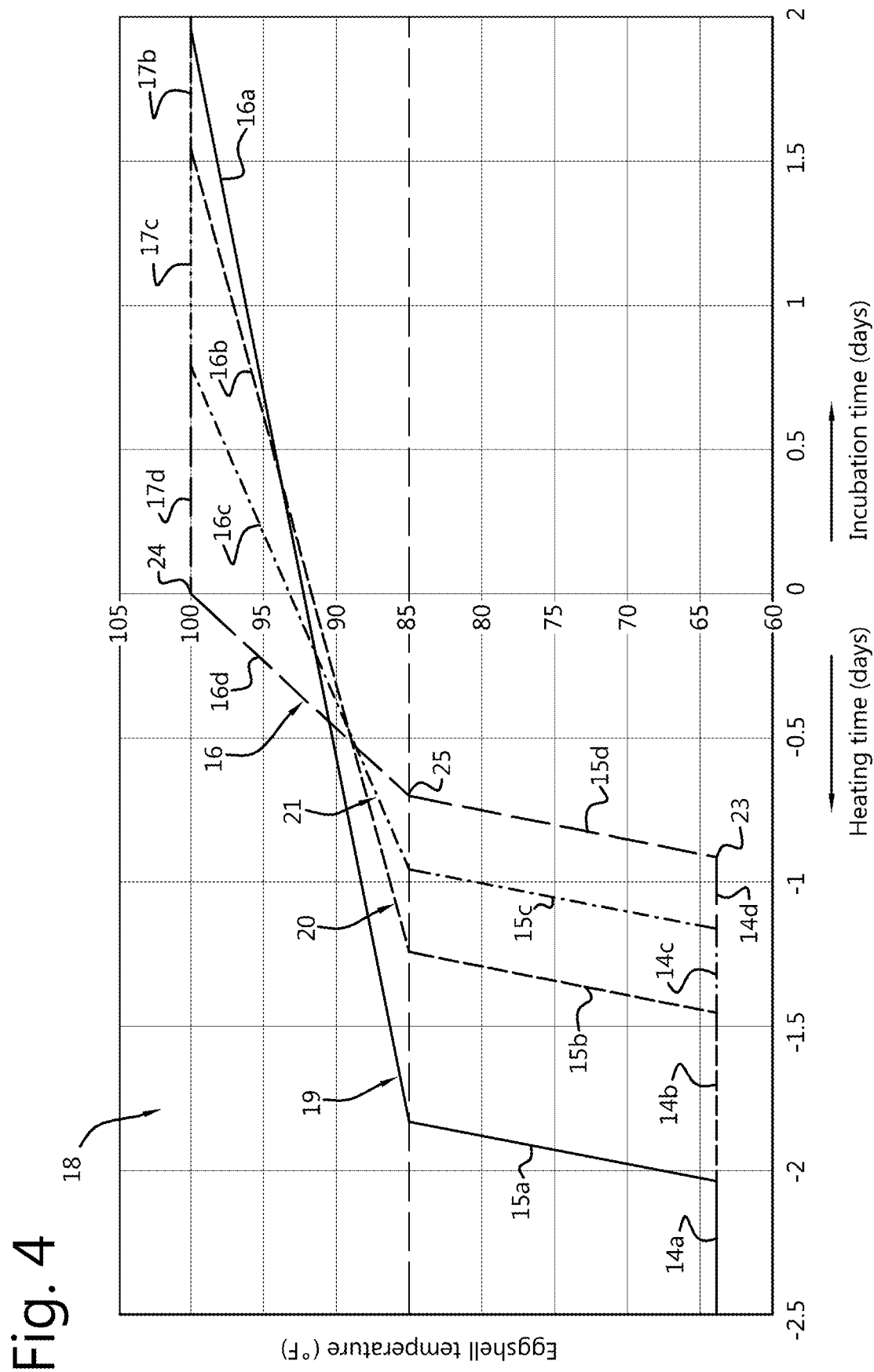
Figure 5:
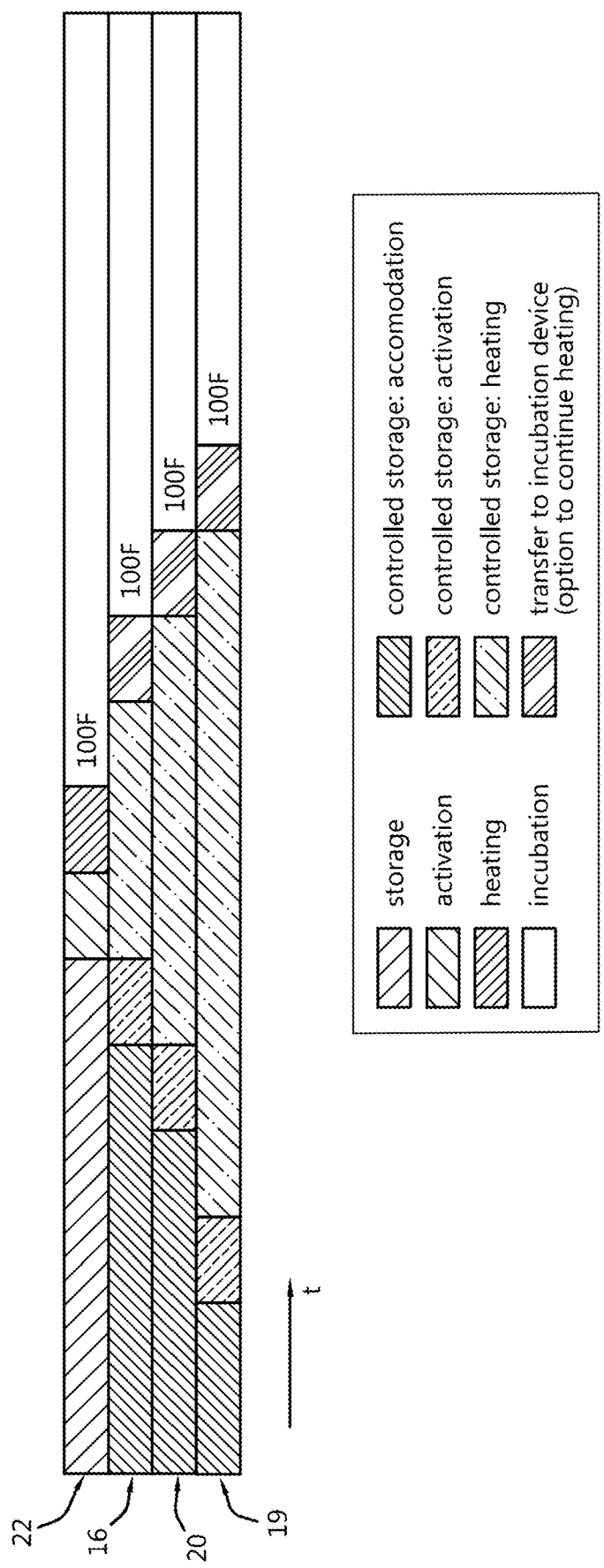

The present invention will be discussed in more detail below, with reference to the attached drawings, in which
  FIG. 1 shows a schematic front view of a hatchery according to the invention;
  FIG. 2 shows a front view of an embodiment of an egg storage system according to the invention;
  FIG. 3 shows a graph of a temperature course over time according to the invention,
  FIG. 4 shows a graph of a number of temperature courses over time in embodiments according to the invention;
  FIG. 5 is a type of "stacked bar chart" of subsequent steps in embodiments of the method according to the invention; and
  FIG. 6 shows a schematic view of a step in an embodiment of the method according to the invention.

DESCRIPTION OF EMBODIMENTS

FIG. 1 shows a schematic front view of a hatchery 1 according to the invention. The hatchery 1 comprises an egg storage system 2. The egg storage system 2 is configured for use in a method according to the invention as described. The egg storage system 2 comprises an egg storing section 4a.

The egg storing section 4a is configured for storing eggs 28 during a heating period in storage prior to incubation. The egg storage section 4a is configured to heat eggs from an initial temperature to a set temperature. Therefore, the egg storage section 4a comprises a temperature control system 6a to control a temperature in the egg storage section. The temperature control system 6a comprises a heating device 9a to supply heat to the egg storage section 6a. The temperature control system 6a comprises a temperature sensor 10a to measure the temperature in the egg storage section 6a.

In this case, the hatchery comprises a central control unit 27. The central control unit 27 is operationally coupled with both the temperature control system 6a, 6b of the egg storage section 3 and a temperature control system 26 of the incubating device 11. The central control unit 27 comprises instructions in accordance with the temperature course over time 16, 19, 20, 21 as shown in FIGS. 3 and 4, to which the number of eggs should be exposed to.

In this case, the egg storage system comprises a number of egg storage sections 4a, 4b. An egg storage section 4a can also be referred to as compartment 4a of the egg storage section. Here, the egg storage system 2 has two egg storage sections 4a, 4b. In this case, the two respective compartments 4a, 4b each have their own respective temperature control system 6a, 6b to enable operating the at least two respective compartments at a different temperature. The temperature in the two respective compartments 4a, 4b can be individually controlled. For each of the two respective compartments 4a, 4b there can be determined an own individual temperature course over time to which the number of eggs in the respective compartment should be exposed.

In this case, each of the number of respective compartments 4a, 4b comprise a respective temperature control system 6a, 6b to control a temperature in the respective compartment 4a, 4b. Therefore, the temperature and temperature course over time can be tailored to the number of eggs in the respective compartment 4a, 4b.

The Hatchery 1 comprises the egg storage system 2 as well as an incubating device 11. The incubating device 11 is separate from the egg storage section 3. The incubating device 11 is configured for incubating eggs during an incubation period at an incubation temperature. The incubating period is normally 21 days as an industry standard. The incubation temperature is normally 100° F. which is about 37.8° C.

FIG. 2 shows a front view of an egg storage section 3 in an embodiment of an egg storage system according to the invention. In this case, the egg storage section 3 comprises an egg compartment formed by an egg trolley 7. The trolley 7 contains a number of egg trays 12. The trays 12 can be stacked or are configured to be stackable. The egg trays 12 are filled with poultry eggs 28, in this case chicken eggs.

The trolley 7 is enclosed by a cover 8 that isolates the interior of the trolley 7 from the surroundings to such an extent that the temperature in the interior of the trolley 7 can be controlled. The egg storage section 3 comprises a temperature control system 6c to control the temperature within the interior of the trolley 7. The cover 8 is configured as a temporary cover that can be easily arranged on and taken from the trolley 7. In this case, the cover 8 encloses one trolley 7 however any suitable number of trolleys 7 is conceivable.

FIG. 3 shows a graph 12 of a temperature course over time 13 according to the invention. The graph illustrates the temperature course over time 13 that the number of eggs is exposed to during the method according to the invention.

The method for incubating a poultry egg on a hatchery 1 is described under reference to FIGS. 1-3. The method for incubating a poultry egg on a hatchery 1 comprises the step of receiving in the storage section 3 a number of eggs at a time of arrival. The number of eggs normally originate from a laying farm and are transported to the hatchery to be incubated there until hatching occurs.

The method for incubating a poultry egg on a hatchery 1 comprises the step of storing a number of eggs in the egg storage section 3 for a heating period in storage of at least 1 days, like a number of days, for example between 2-4 days. The egg storage section 3 functions as a buffer that enables to improve a degree of filling of the incubating device 11.

The method for incubating a poultry egg on a hatchery 1 comprises the step of transporting 5 the number of eggs from the storage section 3 into the incubating device 11.

The method for incubating a poultry egg on a hatchery 1 comprises the step of incubating the number of eggs in the incubating device 11 during the incubation period until hatching occurs.

In the context of the current invention, it is important that the method for incubating a poultry egg on a hatchery 1 comprises the step of determining a temperature course over time 13 to which the number of eggs should be exposed based on the time of arrival and desired moment of hatching. In other words, the step of determining a temperature course over time 13 can only be performed when or as soon as the time of arrival as well as the desired moment of hatching is known. The temperature course over time at least comprises a temperature increase phase 16 during the heating period in storage in the storage section from an initial temperature 23 to a set temperature 24. The set temperature 24 is between a physiological zero and the incubation temperature. In this case, the set temperature 24 is similar to the incubation temperature which is normally about 100° F. (37.8° C.). Thus, in this case, the temperature course over time 13 comprises heating the number of eggs in the incubating device 11 from the set temperature 23 to the incubation temperature 24. The initial temperature 23 as shown, is the usual storage temperature of about or less than 64° F. (17.8° C.). Of course, it is conceivable the eggs arrive at a slightly different temperature than the initial temperature 23.

In the context of the current invention, it is important that the method for incubating a poultry egg on a hatchery 1 comprises the step of heating the number of eggs during the heating period in storage from the initial temperature 23 to the set temperature 24.

In this case, the egg storage section 3 comprises a number of compartments 4a, 4b, wherein at least two respective compartments of the number of compartments have their own respective temperature control system 6a, 6b to enable operating the at least two respective compartments at a different temperature. As a result, the step of determining a temperature course over time 13 can be or is done individually for both compartments 6a, 6b. Each compartment 6a, 6b has its own temperature course over time 13.

In this case, the heating the number of eggs in the storage section from the initial temperature 23 to the set temperature 24 in phase 16 comprises increasing the temperature during at least 20% of the heating period in storage, in this case during the entire heating period in storage, with linear progression. In other words, the method comprises minimizing a temperature gradient in an interval of at least 12 hours during the heating phase 16 of the number of eggs during the heating period in storage. In a different approach, during the step of heating the number of eggs during the heating period in storage from the physiological zero 25 to the set temperature 24, the temperature gradient over a time interval of 24 hours is between 0,075° F. (0.042° C.)/hour to 0.85° F. (0.47° C.)/hour. The temperature gradient does not exceed 1° F. (0.56° C.)/hour.

In this case, the temperature course over time 13 comprises a predetermined activation period 15. In the activation period 15, the number of eggs is heated from the initial temperature 23 to the physiological zero 25. The activation period 15 being "predetermined" is to say that this period can be determined independent from the time of arrival as well as the desired moment of hatching. The activation period is a standard period of normally about 5 hours.

In this case, the temperature course over time 13 comprises a predetermined accommodation period 14 wherein the number of eggs is maintained at the initial temperature 23.

The determining of the temperature course over time 13 to which the number of eggs should be exposed commences as soon as possible, preferably directly, after the time of arrival. It will be clear that thereafter, executing the temperature course over time 13 starts as soon as possible by instructing the temperature controller 6a accordingly. The method according to the invention is in particular useful for long stored eggs.

FIG. 4 shows a graph of a number of temperature courses over time 16, 19, 20, 21 in embodiments according to the invention. The temperature course 16 is identical to the one shown in FIG. 3 and is shown here as comparison.

All temperature courses over time 19, 20, 21 and 16 comprise a predetermined accommodation period 14a, 14b, 14c and 14d wherein the number of eggs is maintained at the initial temperature 23. The duration of the accommodation period differs depending on time allocated to heating of the number of eggs in the storage section 3.

In this case, all temperature courses over time 19, 20, 21 and 16 comprise a predetermined activation period 15a, 15b, 15c and 15d. In the activation period 15, the number of eggs is heated from the initial temperature 23 to the physiological zero 25. The activation period 15 being "predetermined" is to say that this period can be determined independent from the time of arrival as well as the desired moment of hatching. The activation period is a standard period of normally about 5 hours.

All temperature courses over time 19, 20, 21 and 16 comprise a temperature increase phase 16a, 16b, 16c and 16d during the heating period in storage in the storage section from an initial temperature 23 to a set temperature 24. The set temperature 24 is between a physiological zero and the incubation temperature. In case of temperature course 16, the set temperature 24 is similar to the incubation temperature which is normally about 100° F. (37.8° C.). The temperature courses 19, 20, 21 differ with the temperature course 16 in that the temperature increase during the heating period in storage in the storage section is from an initial temperature 23 to a set temperature about right between a physiological zero 25 and the incubation temperature 24. This means that the temperature gradient can be further minimized as clearly shown. In other words, the heating of the number of eggs is continued in the incubation device 11. The temperature course over time 19, 20, 21 is thus executed in both the storage section 3 and the incubation device 11.

As a result of the heating of the number of eggs during the heating period in storage and in the storage section 3, the method allows adjusting the incubation period depending on the heating period in storage and degree of heating. In other words, the heating of the number of eggs during the heating period in storage influences the stay in the incubating device as well as the stay at the hatchery 1. In particular the incubation period is reduced with at least 12 hours compared to industry standard of 21 days.

The aspect that the heating of the number of eggs during the heating period in storage influences the stay in the incubating device as well as the stay at the hatchery 1, is also visualized in FIG. 5 that shows a "stacked bar chart" of subsequent steps in embodiments of the method according to the invention. The stacked bars 19, 20, 16 correspond to similar temperature courses as the temperature courses over time 19, 20, 16 as shown in FIG. 4. As a comparison, a prior art way to incubate eggs is shown in stacked bar 22. In that case, the poultry embryo is activated and heated outside the storage only.

FIG. 6 shows a schematic view of a step 25 in an embodiment of the method according to the invention. The method step 25 comprises organizing and/or grouping of the number of eggs into batches of eggs. As a result, this enables that all embryos of the number of eggs have the same age which enables to make use of warming profiles in a so-called single stage incubator. Here, the trolleys 7a, 7b, 7c, 7d are grouped into batches of eggs of trolley 7a and 7b on the one hand and trolley 7c and 7d on the other hand. Therefore, for each off the batches of eggs, the suitable temperature course over time can be determined individually.

The present invention has been described above with reference to a number of exemplary embodiments as shown in the drawings. Modifications and alternative implementations of some parts or elements are possible and are included in the scope of protection as defined in the appended claims.

The invention claimed is:

1. Method for incubating a poultry egg on a hatchery, the hatchery comprising:
    an egg storage section configured for storing eggs;
    an incubating device separate from the egg storage section and configured for incubating eggs during an incubation period at an incubation temperature; and
    a control unit operatively connected to the egg storage section;
    the method comprising the steps of:
    receiving in the storage section a number of eggs at a time of arrival,
    storing a number of eggs in the egg storage section for a heating period in storage of at least 1 days, and
    transporting the number of eggs from the storage section into the incubating device,
    incubating the number of eggs in the incubating device during the incubation period until hatching occurs,
    wherein the control unit is configured for:
    determining a temperature course over time to which the number of eggs should be exposed based on a determined time of arrival and a desired moment of hatching, wherein the temperature course over time at least comprises a gradual temperature increase during the heating period in storage in the storage section from a measured initial temperature at the time of arrival to a set predetermined temperature between a physiological zero and the incubation temperature,
    controlling a temperature control system for heating the number of eggs during the heating period in storage from the initial temperature to the set temperature according to the determined temperature course over time.

2. Method according to claim 1, wherein the egg storage section comprises a number of compartments, wherein at least two respective compartments of the number of compartments have their own respective temperature control system to enable operating the at least two respective compartments at a different temperature.

3. Method according to claim 2, wherein the step of determining a temperature course over time is done individually for at least one compartment of the number of compartments.

4. Method according to claim 1, comprising organizing and/or grouping of the number of eggs into batches of eggs and individually for each off the batches of eggs determining a temperature course over time.

5. Method according to claim 1, wherein the heating period in storage in the storage section is at least 24 hours.

6. Method according to claim 1, wherein heating the number of eggs in the storage section from the initial temperature to the set temperature comprises increasing the temperature during at least 80% of the heating period in storage, in particular during the entire heating period in storage.

7. Method according to claim 1, comprising increasing the temperature during the heating period in storage with linear progression in an interval of at least 12 hours, in particular in an interval of at least 50% of the heating period in storage, more in particular during about the entire heating period in storage.

8. Method according to claim 1, wherein during the step of heating the number of eggs during the heating period in storage from the initial temperature to the set temperature, the gradient over a time interval of 24 hours is between 0,075° F. (0.042° C.)/hour and about 1° F. (0.56° C.)/hour.

9. Method according to claim 1, comprising heating the number of eggs evenly over time during the entire heating period in storage.

10. Method according to claim 1, comprising adjusting the incubation period depending on the heating period in storage.

11. Method according to claim 10, comprising reducing the incubation period with at least 12 hours compared to industry standard.

12. Method according to claim 1, wherein the temperature course over time comprises a predetermined accommodation period wherein the number of eggs is maintained at the initial temperature in the storage section or brought to a storage temperature in the egg storage section and then maintained at the initial temperature in the storage section.

13. Method according to claim 1, wherein the temperature course over time comprises a predetermined activation period wherein the number of eggs is heated from the initial temperature to the physiological zero in the egg storage section.

14. Method according to claim 13, wherein the heating period in storage is at least four times the predetermined activation period.

15. Method according to claim 1, wherein determining the temperature course over time to which the number of eggs should be exposed commences as soon as possible, preferably directly, after the time of arrival.

16. Method according to claim 1, wherein the number of eggs comprise long stored eggs.

17. Method according to claim 1, wherein the set temperature is the incubation temperature or about the incubation temperature.

18. Method according to claim 1, wherein the temperature course over time comprises heating the number of eggs in the incubating device from the set temperature to the incubation temperature.

* * * * *